United States Patent [19]
Olive

[11] Patent Number: 5,115,998
[45] Date of Patent: May 26, 1992

[54] ANNULAR BALLOON

[75] Inventor: Leonard W. Olive, Hawthorne, Calif.

[73] Assignee: The United States of America as represented by the Secretary of the Air Force, Washington, D.C.

[21] Appl. No.: 546,134

[22] Filed: Jun. 29, 1990

[51] Int. Cl.$^5$ .............................................. B64B 1/58
[52] U.S. Cl. ...................... 244/31; 244/126; 52/2.23
[58] Field of Search .................. 52/2 J, 2 N, 2 K, 2 R, 52/2.19–2.26; 343/872; 244/30, 31, 98, 126, 128, 146

[56] References Cited

U.S. PATENT DOCUMENTS

| | | | |
|---|---|---|---|
| 2,986,242 | 5/1961 | Clevett, Jr. ............................. | 52/2 N |
| 2,996,212 | 8/1961 | O'Sullivan, Jr. ....................... | 244/31 |
| 3,277,724 | 10/1966 | Lundeberg ............................. | 244/31 |
| 3,332,176 | 7/1967 | Knetzer .................................. | 52/2 J |
| 3,384,328 | 5/1968 | McGee .................................. | 244/31 |
| 3,676,276 | 7/1972 | Hirshen et al. ........................ | 161/17 |
| 4,434,958 | 3/1984 | Rougeron et al. .................... | 244/126 |
| 4,833,837 | 5/1989 | Bonneau ................................ | 52/2.19 |
| 4,934,631 | 6/1990 | Birbas ................................... | 244/30 |
| 4,971,269 | 11/1990 | Koda ...................................... | 244/158 R |

FOREIGN PATENT DOCUMENTS

| | | | |
|---|---|---|---|
| 3829617 | 3/1990 | Fed. Rep. of Germany ........ | 244/31 |
| 557259 | 7/1972 | Switzerland .......................... | 244/31 |

Primary Examiner—Joseph F. Peters, Jr.
Assistant Examiner—Carla Mattix
Attorney, Agent, or Firm—Thomas C. Stover; Donald J. Singer

[57] ABSTRACT

The invention provides a double-walled, annular balloon which requires less gas to inflate than its volume would indicate. The balloon is formed of double-walled gores joined by continuous overlapping seams, in the longitudinal direction, with intermittent seams in the latitudinal direction, to divide each gore into a serious of connecting inflatable compartments. Each gore is connected to a common plenum which is connected in turn, to a compressed gas container. The gores are inflated at the same time from such common plenum and the balloon, when inflated, can appear as a globe having longitudinal and latitudinal seams therearound with the common plenum contacting the gores at proximate the north pole, thereof. Each gore terminates in a seam proximate the south pole, which seam defines a closed loop which forms an entrance port into such balloon. Due to the longitudinal and latitudinal seams, the balloon, when inflated, forms a stiff annular body which can serve as a container balloon for various articles on earth and in outer space. The balloon further requires much less gas to fully inflate e.g. by a factor of 13 than does a prior art, single-layer balloon of comparable size.

14 Claims, 2 Drawing Sheets

ANNULAR BALLOON

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to inflatable balloons particularly balloons which require less gas to inflate.

2. The Prior Art

Balloons are generally single compartment bodies which are inflated, from small toy balloons to the large passenger carrying variety. The larger balloons can require considerable amount of gas to inflate them and maintain the desired pressure therein. Also despite their considerable volume, most balloons cannot function as containers except for the inflating fluid. That is opening a port to put an article in the balloon will allow gas to escape and cause a considerable pressure drop in such balloon.

As noted above, prior art balloons, are generally of the single wall type which are inflated by internal pressure. For large balloons, the weight and volume of gas to inflate them becomes prohibitive e.g. for a thirty-foot diameter balloon.

An example of a single compartment spheroid fluid container is shown in U.S. Pat. No. 4,434,958 to Rougeron (1984). Here, in order to "inflate" such container, the entire structure must be filled with fluid.

A different prior art structure is disclosed in U.S. Pat. No. 3,676,276 to S. Hirshen et al (1969) which has a plurality of inflatable cells arranged end-to-end in a circle. Such body has a plurality of inflatable compartments, which body however cannot serve as a container except for the fluid or gas therein.

There is also a need to use balloons as containers for other than the inflating fluid therein, e.g. for containers on earth or in space or as discussed below.

Accordingly, there is a need and market for a balloon which requires less gas to inflate it than its overall volume would indicate and also a balloon which in some applications, can act as a container for an article other than the inflating medium. That is, there is a need and market for a balloon of new concept and design, which overcomes the above prior art shortcomings.

There has now been discovered a balloon which can be inflated with less gas than its overall volume would indicate, which balloon can, if desired, act as a container for articles as noted below.

SUMMARY OF THE INVENTION

Broadly the present invention provides, a balloon which requires less gas than its volume would indicate, comprising a double-walled balloon, which includes inflatable gores between such walls, which gores when inflated, define a hollow annular body, which gores are joined side-by-side by longitudinal seams.

In a preferred embodiment, such hollow annular balloon has a means for inflating such balloon at the north pole thereof and an opening portal therein for an article, to encapsulate same in whole or part.

The annular balloon of the invention has applications other than a container e.g. as an orbiting reflective body or as an antenna device.

BRIEF DESCRIPTION OF THE DRAWINGS

The invention will become more apparent from the following detailed specification and drawings in which.

DESCRIPTION OF PREFERRED EMBODIMENT

Figure 1:
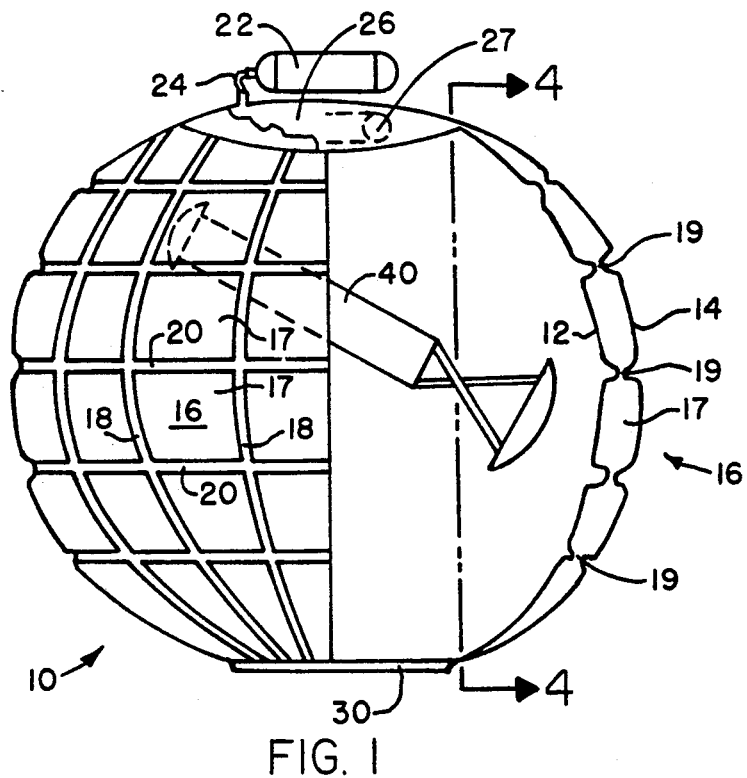
FIG. 1 is an elevation view, partly in section, of the annular balloon embodying the present invention.
Figure 4:
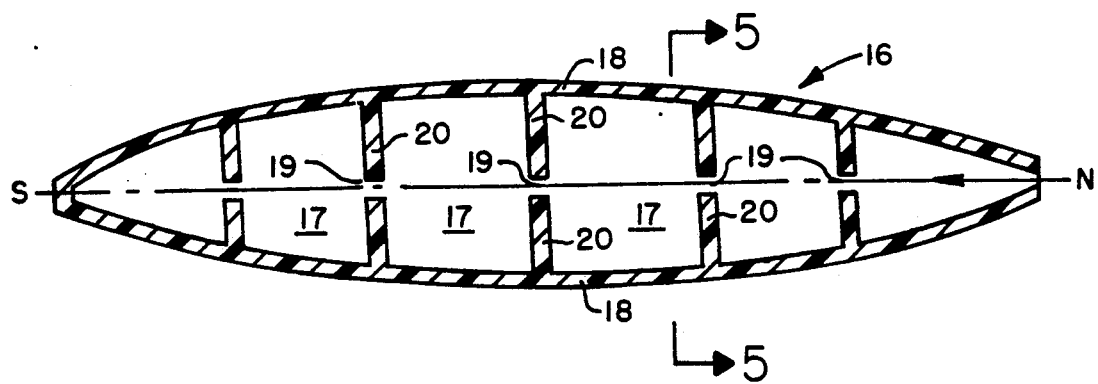
FIG. 4 is a sectional elevation schematic view of the balloon of FIG. 1, taken on a lines of 4—4, looking in the direction of the arrows
Figure 5:
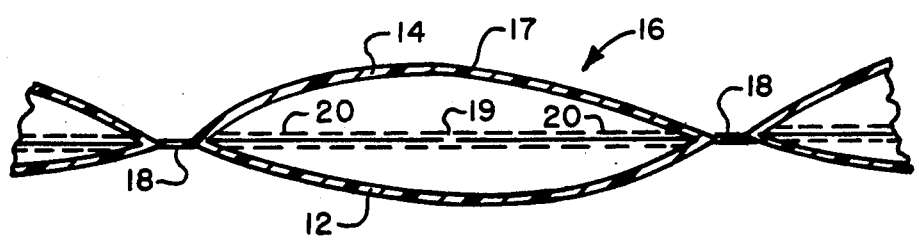
FIG. 5 is a cross-section elevation view of the balloon portion shown in FIG. 4, taken on lines 5—5, looking in the direction of the arrows.

Referring now in more detail to the drawings, annular balloon 10 has double walls 12 and 14 which define gores 16 between each pair of longitudinal seams 18, which gores are divided by latitudinal intermittent seams 20, as shown in FIGS. 1, 4 and 5.

Figure 2:
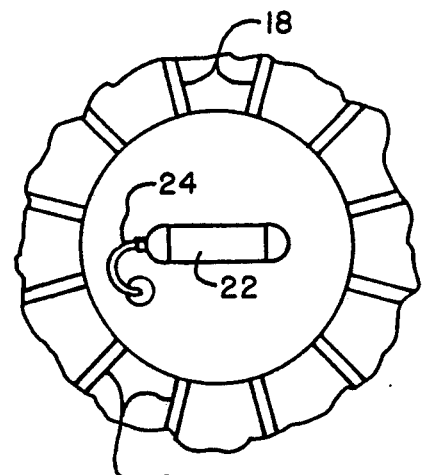
FIG. 2 is a partial plan view of the balloon of FIG. 1.

The annular balloon 10 has a compressed gas tank 22 mounted thereon, which communicates by hose 24 to plenum 26, located at the north pole of such annular balloon 10, as shown in FIGS. 1 and 2. The plenum 26 is within the double walls 12 and 14 of such balloon 10 and communicates with each gore 16, proximate the north pole thereof, as shown in FIG. 1.

Figure 3:
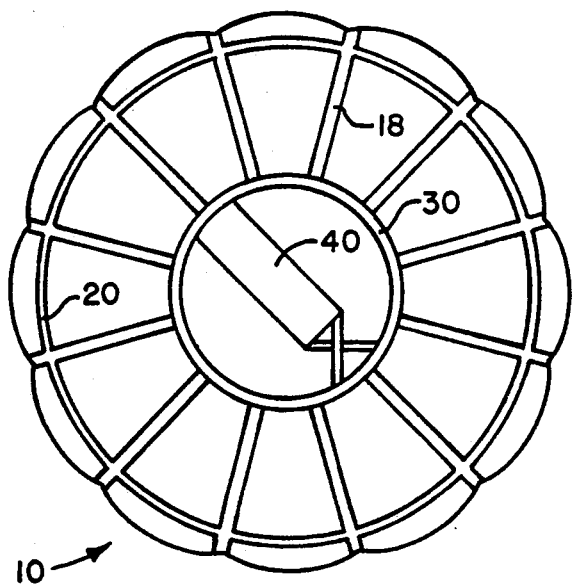
FIG. 3 is a bottom plan view of the balloon shown in FIG. 1.

The balloon 10 has an opening at the south pole thereof, as defined by seam 30, which seals the end of each gore 16 proximate such south pole, as shown or indicated in FIGS. 1, 3 and 4.

The latitudinal seams 20 cross the gores 16 and form intermittent seals to divide each gore into a plurality of inflatable compartments 17, as shown in FIGS. 1, 4 and 5. That is, each seal is interrupted between the compartments 17, e.g. at opening 19, shown in FIG. 4, to permit gas flow therebetween from the north pole to the south pole, as shown in FIGS. 1, 4 and 5.

To inflate the annular balloon of the invention, an actuator (not shown) opens the line 24 to the compressed gas tank 22 which feeds compressed gas, e.g. nitrogen, into the plenum 26, (or into a tubular channel 27 per FIG. 1) which in turn, inflates the respective gores 16, north to south, through successive compartments 17 in each gore, to form the annular balloon 10, such as shown in FIGS. 1 and 3, having an access port 30 thereinto.

The annular balloon of the invention can serve several purposes. For example, on earth, such balloon can serve as a highly visible display or a protective container for an article or even a structure or housing, e.g. for a radar antenna.

Such annular balloon can also be deployed in outer space e.g. as an orbiting satellite, including as a reflector or wired as an antenna. Such orbiting balloon can also receive a weather satellite or other article therein, attached or free floating therein for housing, shielding or otherwise encapsulating such article therein. For example, as shown in FIG. 1, balloon 10 encapsulates or encloses satellite 40, which freely floats and turns within the confines thereof, in outer space.

The annular balloon of the invention can be constructed at virtual any useful size e.g. less than 4 feet in diameter or over 40 feet in diameter, as desired, within the scope of the invention. For outer space use, a suitable size is 25 to 35 feet in diameter. In the case of large, single-wall, prior art balloons, e.g. 30 feet in diameter, the weight and volume of gas to inflate such balloon becomes prohibitive. That is, in the case of a 30 foot diameter annular balloon of the present invention, the weight of gas required to fully inflate same to a comparable size and pressure is over 13 times less. That is, to inflate the prior art single wall 30 foot balloon about 19.5 pounds of $N_2$ is required By contrast, to inflate a 30 foot diameter, annular, double-wall balloon of the present invention to a comparable size and pressure, only 1.5 pounds of such gas is required.

The balloon of the invention can be made of stretchable or non-stretchable material. Preferably however, non-stretchable material (e.g. Mylar TM or Kapton TM) are employed separately or in combination Desirably the balloon gores are separately constructed and bonded together at overlapping longitudinal seams, e.g. seams 18 shown in FIGS. 1, 4 and 5. A globular shaped, container balloon of the present invention, can be constructed of any number of gores, a suitable range being 24 to 36 gores.

As noted above, each gore is preferably inflated at the same time, from a common plenum, with the gas flow through the two layers of each gore from north pole to south pole, through the intermittent seams of each consecutive compartment in each gore. The combination of the gas pressure in the gores, the overlapping longitudinal seams between gores and hoop tension of the latitudinal seams (of non-stretchable material) traversing or girdling such gores, give the container balloon of the present invention a relatively rigid, rounded shape. Thus the annular balloon of the invention can sustain its shape and size whether on earth or in space, whether employed or deployed either without contents or housing one or more articles therein.

As noted above, the annular balloon of the invention can be formed of gores of stretchable material within the scope of the invention. However, such balloon, formed of gores of non-stretchable material, provides for a more rigid annular balloon structure and provides a balloon of more predictable size and shape. In addition, the balloon will travel, in space, in a more predictable path.

The annular balloon of the invention can be inflated to any desired pressure including a range of from 1/10 psi to ½ psi. On earth, about 178 psi provides satisfactory balloon inflation while in the near-vacuum of space, about 1/10 psi provides suitable inflation to such annular balloon.

The annular balloon of the invention can take various inflated shapes as desired, within the scope of the invention, from globular to elongated or other suitable shapes.

The intermittent seams that divide the respective gores into connecting gas compartments can be of interrupted seams, which allows the passage therethrough, from one such compartment to the next. In another embodiment, adhesive sealant can be omitted from otherwise continuous latitudinal seams, to provide the required porosity or gas flow between such compartments.

The container balloon of the present invention can be inflated with various types of gas, as desired or warranted by the application, such as helium, air or nitrogen or other suitable gases.

Thus, the annular balloon of the invention has several salient and novel features including;

1) Such balloon inflates with far less gas than prior art single layer balloons of comparable size, 2. Such annular balloon can contain, house or shield various articles therein, 3. Advantageously each gore is provided with a check valve proximate the plenum so that should a gore be punctured, the annular balloon of the invention still holds its shape.

I claim:

1. A balloon which requires less gas to inflate than its overall volume would indicate comprising, a detached and self supporting balloon having double walls which include inflatable gores therein, which gores when inflated define a hollow annular body, said gores being joined side-by-side by longitudinal seams, said balloon being free of rigid framework.

2. The balloon of claim 1 wherein said annular body is in the shape of a globe.

3. The balloon of claim 1 wherein said gores are crossed latitudinally by at least one porous seam to divide said gores into compartments yet permit the flow of gas therein from one compartment to the other.

4. The balloon of claim 3 wherein said gores are crossed latitudinally by a plurality of spaced porous seams.

5. The balloon of claim 4 wherein said annular body is in the shape of a globe, said gores run north to south and join proximate the north pole of said globe, which gores terminate in a seam proximate the south pole of said globe, which seam defines an entrance port into said balloon, for receiving an article at least partially within said annular body.

6. The balloon of claim 5 having a container of compressed gas mounted on said annular body proximate said north pole, which container communicates with all of said gores for inflation thereof from north to south, through the porous latitudinal seams in each such gore.

7. The balloon of claim 6 having a plenum mounted proximate said north pole and communicating with the northerly portion of each gore, said plenum communicating in turn with said compressed gas container and means to activate said container to feed gas first into said plenum and then into said gores to inflate said annular body.

8. The balloon of claim 7 having 24 to 36 gores.

9. The balloon of claim 7 wherein said gores are joined side-by-side at continuous overlapping longitudinal seams, which gores are crossed latitudinally by a plurality of intermittent seams which divide each gore into a plurality of compartments which communicate for gas flow therebetween through such intermittent seams.

10. The balloon of claim 9 having, when inflated, the combination of gas pressure in said compartments, the overlapping longitudinal seams and hoop tension from the latitudinal seams to give the balloon when inflated, hollow annular body stiffness.

11. The balloon of claim 4 wherein said latitudinal seams are continuous but with intermittent adhesive seals therein.

12. The balloon of claim 6 wherein said compressed gas is $N_2$.

13. The balloon of claim 1 wherein said gores are made of Mylar or Kapton or other material which resists radar detection.

14. The balloon of claim 7 wherein said plenum has a circular channel therein communicating with each gore and said compressed gas container for inflation of said gores therethrough.

* * * * *